United States Patent Office.

JOHN HASELTINE, OF WARREN, NEW HAMPSHIRE, ASSIGNOR TO HIMSELF AND PERSON NOYES, OF LOWELL, MASSACHUSETTS.

Letters Patent No. 75,264, dated March 10, 1868.

IMPROVED COMPOSITION FOR STUFFING LEATHER.

*The Schedule referred to in these Letters Patent and making part of the same.*

TO ALL WHOM IT MAY CONCERN:

Be it known that I, JOHN HASELTINE, of Warren, in the county of Grafton, and State of New Hampshire, but at present residing at Methuen, in the county of Essex, and State of Massachusetts, have invented certain new and useful Improvements in Composition for Stuffing Leather in the process of manufacture, and while in use, and forming a part or the whole of some article or device for wear, or otherwise; and I hereby declare the following to be a full, clear, and exact description of my invention, and of the process of compounding and using the same.

Specimens of the composition, and the ingredients of which the composition is made, accompany this application.

This invention consists in a new composition of substances or ingredients for stuffing leather, which is intended for horse-harnesses, or for the uppers of boots and shoes, and various other purposes, and has for its object to keep the leather soft, limber, and pliable for a very long time; also to soften old or dry leather, or horse-harnesses made of leather, or leather hose which are used in connection with hydrants and fire-engines, and leather used for various other purposes.

In making my improved composition for stuffing leather, I prepare in a suitable tank or kettle, say, about eight gallons of alkaline solution, which may be strong lye, or a solution of potash, or other similar solution, with considerable heat applied to the bottom or sides of the tank or kettle, or by steam to the substance within. I then add to the alkaline solution about one gallon of fatty oil or grease, or from eight to ten pounds by weight, intending to add as much oil or grease as can be incorporated with the alkali. After these two ingredients have become considerably mixed or incorporated, I add to the mixture from two to five pounds of common rosin, and stir or agitate the mixture while under the action of the heat till the whole is well united into a mass. I then add from one to five ounces of soda-ash, and again stir or agitate the mass for a short time, when it will become thickened to the desired degree or consistency for use after cooling, or to be removed and put up in cans, jars, or cakes.

The mixture of alkali and grease or oil, and so large a proportion of the grease or oil, makes a sort of soapy substance, and yet it will not answer the purpose of soap, viz. to remove grease, as such mixture contains all the grease or oil it will take up or unite with.

The rosin has a tendency to harden the composition, but too large a quantity would give it a brownish color, which I wish to avoid. The soda-ash has a tendency to thicken the composition, and also to give a clearer and lighter appearance, or to bleach it, or remove all darker shades, so that the composition may be applied to leather of a light color, or even to white leather, and not stain it, or materially change the shade or color.

In mixing my improved composition for stuffing leather, instead of applying the rosin in its natural state, I sometimes take a portion of the grease or some tallow, and combine it with the rosin, or make some rosin-oil, and then add the last-named substance to and unite it with the first-named alkali solution, and a little less of the grease or fatty oil first named, taking good care not to add too large a quantity of the grease and rosin mixture, or of the rosin-oil, to overcharge the alkali, which would prevent or retard the combining and uniting operation of all the ingredients to form the desired composition.

In stuffing leather with my improved composition, it may be applied either cold or warm, and worked into the leather by any well-known process, either while the leather is in the hands of the curriers or finishers, or after it has been made into articles, implements, or devices, and either while new or unused, or after such articles, implements, or devices have been considerably or not much used.

Old or dried and hardened leather, like horse-harnesses, or hose, or boots and shoes, and various other leather articles, are fully restored to a pliable, limber, and useful condition by my improved composition, or greatly improved, and rendered serviceable.

Having fully described my invention, and the manner of compounding and using the same, what I claim as new, and desire to secure by Letters Patent, is—

The combination of the herein-described ingredients in about the proportion specified, for the purpose and in the manner substantially as described.

JOHN HASELTINE.

Witnesses:
CHAS. HUNT,
JOHN E. CRANE.